United States Patent
Aoyagi et al.

(10) Patent No.: US 12,463,576 B2
(45) Date of Patent: Nov. 4, 2025

(54) INVERTER CONTROL DEVICE AND INVERTER CONTROL METHOD

(71) Applicant: HITACHI ASTEMO, LTD., Hitachinaka (JP)

(72) Inventors: Shigehisa Aoyagi, Hitachinaka (JP); Takafumi Hara, Tokyo (JP); Takaya Tsukagoshi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 153 days.

(21) Appl. No.: 18/565,657

(22) PCT Filed: Feb. 15, 2022

(86) PCT No.: PCT/JP2022/005918
§ 371 (c)(1),
(2) Date: Nov. 30, 2023

(87) PCT Pub. No.: WO2022/259624
PCT Pub. Date: Dec. 15, 2022

(65) Prior Publication Data
US 2024/0291417 A1    Aug. 29, 2024

(30) Foreign Application Priority Data

Jun. 9, 2021    (JP) .................. 2021-096908

(51) Int. Cl.
*H02P 27/08*    (2006.01)
*H02P 23/14*    (2006.01)
*H02P 25/026*   (2016.01)

(52) U.S. Cl.
CPC ............ *H02P 27/085* (2013.01); *H02P 23/14* (2013.01); *H02P 25/026* (2013.01)

(58) Field of Classification Search
CPC ............ H02M 1/0025; H02M 7/5395; H02M 7/53873; H02M 1/0041; H02P 27/08; H02P 27/085; H02P 23/14; H02P 25/026
(Continued)

(56) References Cited

U.S. PATENT DOCUMENTS

2008/0106919 A1* 5/2008 Shin .................. H02M 7/48
                                                    363/131
2009/0237013 A1* 9/2009 Sato .................. B60L 15/08
                                                    318/400.15
(Continued)

FOREIGN PATENT DOCUMENTS

JP    H04-125070 A    4/1992
JP    2010-213485 A   9/2010
(Continued)

OTHER PUBLICATIONS

International Search Report with English Translation and Written Opinion in corresponding International Application No. PCT/JP2022/005918, dated Mar. 29, 2022 (8 pages).

*Primary Examiner* — Gabriel Agared
(74) *Attorney, Agent, or Firm* — Foley & Lardner LLP

(57) ABSTRACT

An inverter control device performs pulse width modulation by selecting one of a synchronous pulse control mode in which a frequency of a carrier wave used in the pulse width modulation is changed in accordance with a rotation speed of the motor and an asynchronous pulse control mode in which the frequency of the carrier wave is constant regardless of the rotation speed of the motor. At the time of switching from the asynchronous pulse control mode to the synchronous pulse control mode, the inverter control device changes a carrier reference phase that is a reference value of a phase of the carrier wave to a different value before and after the switching.

7 Claims, 10 Drawing Sheets

(a) SWITCH CONTROL, OF RELATED ART, FROM ASYNCHRONOUS PULSE CONTROL MODE TO SYNCHRONOUS PULSE CONTROL MODE (b) SWITCH CONTROL, OF PRESENT INVENTION, FROM ASYNCHRONOUS PULSE CONTROL MODE TO SYNCHRONOUS PULSE CONTROL MODE

(58) Field of Classification Search
USPC .................................................. 318/400.17
See application file for complete search history.

(56) References Cited

U.S. PATENT DOCUMENTS

| | | | |
|---|---|---|---|
| 2020/0266749 A1* | 8/2020 | Kajino | H02P 27/085 |
| 2020/0280278 A1* | 9/2020 | Tamura | H02P 29/028 |
| 2020/0343847 A1 | 10/2020 | Miyashita | |
| 2023/0141601 A1* | 5/2023 | Hara | B60L 15/007 |
| 2024/0380337 A1* | 11/2024 | Hara | H02M 7/5395 |

FOREIGN PATENT DOCUMENTS

| | | |
|---|---|---|
| JP | 2017-050977 A | 3/2017 |
| WO | WO-2019/123634 A1 | 6/2019 |

* cited by examiner (a) ROTATIONAL SPEED PROFILE (b) CONTROL PROFILE (a) SWITCH CONTROL, OF RELATED ART, FROM ASYNCHRONOUS PULSE CONTROL MODE TO SYNCHRONOUS PULSE CONTROL MODE (b) SWITCH CONTROL, OF PRESENT INVENTION, FROM ASYNCHRONOUS PULSE CONTROL MODE TO SYNCHRONOUS PULSE CONTROL MODE

INVERTER CONTROL DEVICE AND INVERTER CONTROL METHOD

TECHNICAL FIELD

The present invention relates to an inverter control device and an inverter control method.

BACKGROUND ART

Permanent magnet synchronous motors do not require mechanical current rectifying mechanisms such as brushes or commutators, are easy to maintain, are small and lightweight, and thus have high efficiency and a power factor. Therefore, permanent magnet synchronous motors have been widely used for applications such as driving and power generation of electric vehicles. In general, permanent magnet synchronous motors include stators configured with armature coils or the like, and rotors configured with permanent magnets, and iron cores. Direct-current voltages supplied from direct-current power supplies such as batteries are converted into alternating-current voltages by inverters, and alternating-current currents flow through armature coils of permanent magnet synchronous motors using the alternating-current voltages, so that armature magnetic fluxes are generated. The permanent magnet synchronous motors are driven by a magnet torque generated by attractive and repulsive forces generated between the armature magnetic fluxes and the magnet magnetic fluxes of the permanent magnets, and a reluctance torque generated to minimize magnetic resistance of the armature magnetic fluxes passing through the rotors.

In general, a plurality of semiconductor switching elements such as insulated gate bipolar transistors (IGBTs) and metal-oxide-semiconductor field-effect transistors (MOSFETs) are mounted on inverters that supply alternating currents to permanent magnet synchronous motors and control driving of the permanent magnet synchronous motors. Inverter control devices are connected to the inverters, so that, on and off states of semiconductor switching elements are switched between to perform power conversion from direct-current power to alternating-current power by outputting gate signals generated in the inverter control devices to gate terminals of the semiconductor switching elements via drive circuits.

As methods of generating gate signals in the inverter control devices, methods of generating gate signals through PWM modulation are well known. In the PWM modulation, voltage commands generated in response to torque commands from the outside are compared with carrier waves such as triangular waves or sawtooth waves, and gate signals having pulse widths in accordance with comparison results are generated. At this time, either synchronous pulse control for changing frequencies of the carrier waves in synchronization with rotation speeds of the motors or asynchronous pulse control for making frequencies of the carrier waves constant regardless of the rotation speeds of the motors is selected.

In the related art, there are known schemes of switching between asynchronous pulse control and synchronous pulse control in accordance with rotation speeds of motors by selecting the asynchronous pulse control to inhibit noise and vibration at low rotation speeds of the motors or at rotation speeds near resonance frequency bands of mechanism units in which the motors are installed and selecting the synchronous pulse control at other rotation speeds. In such a case, when the asynchronous pulse control and the synchronous pulse control are switched between, phases of the carrier waves become discontinuous, and thus there is concern of control of the motors being unstable.

As a solution to the foregoing problem, a technique of the following PTL 1 is known. PTL 1 discloses a technique for switching from asynchronous PWM to synchronous PWM at a timing at which carrier phases of an asynchronous PWM triangular wave and a synchronous triangular wave match each other.

CITATION LIST

Patent Literature

PTL 1: WO 2019/123634 A

SUMMARY OF INVENTION

Technical Problem

In the technique described in PTL 1, at the timing at which switching from the asynchronous pulse control to the synchronous pulse control should be performed, it is required to wait until the timing at which the carrier phases of the asynchronous PWM triangular wave and the synchronous triangular wave match each other after that timing and, therefore, switching cannot be performed immediately.

The present invention has been devised in view of the foregoing problems, and an object of the present invention is to provide an inverter control device and an inverter control method capable of stably controlling a motor while immediately switching from asynchronous pulse control to synchronous pulse control.

Solution to Problem

According to an aspect of the present invention, an inverter control device controls an inverter to rotationally drive a motor by generating a PWM pulse signal for driving a plurality of switching elements included in the inverter by pulse width modulation and outputting the PWM pulse signal to the inverter. The inverter control device performs the pulse width modulation by selecting one of a synchronous pulse control mode in which a frequency of a carrier wave used in the pulse width modulation is changed in accordance with a rotation speed of the motor and an asynchronous pulse control mode in which the frequency of the carrier wave is constant regardless of the rotation speed of the motor. At the time of switching from the asynchronous pulse control mode to the synchronous pulse control mode, the inverter control device changes a carrier reference phase that is a reference value of a phase of the carrier wave to a different value before and after the switching.

According to an aspect of the present invention, an inverter control method is a method of controlling an inverter to rotationally drive a motor by generating a PWM pulse signal for driving a plurality of switching elements included in the inverter by pulse width modulation and outputting the PWM pulse signal to the inverter. The method includes: performing the pulse width modulation by selecting one of a synchronous pulse control mode in which a frequency of a carrier wave used in the pulse width modulation is changed in accordance with a rotation speed of the motor and an asynchronous pulse control mode in which the frequency of the carrier wave is constant regardless of the rotation speed of the motor; and changing, at the time of switching from the asynchronous pulse control mode to the synchronous pulse control mode, a carrier reference phase that is a reference value of a phase of the carrier wave to a different value before and after the switching.

Advantageous Effects of Invention

According to the present invention, it is possible to provide an inverter control device and an inverter control method capable of stably controlling a motor while immediately switching from asynchronous pulse control to synchronous pulse control.

DESCRIPTION OF EMBODIMENTS

First Embodiment

Hereinafter, a first embodiment of the present invention will be described with reference to the drawings.

Figure 1:
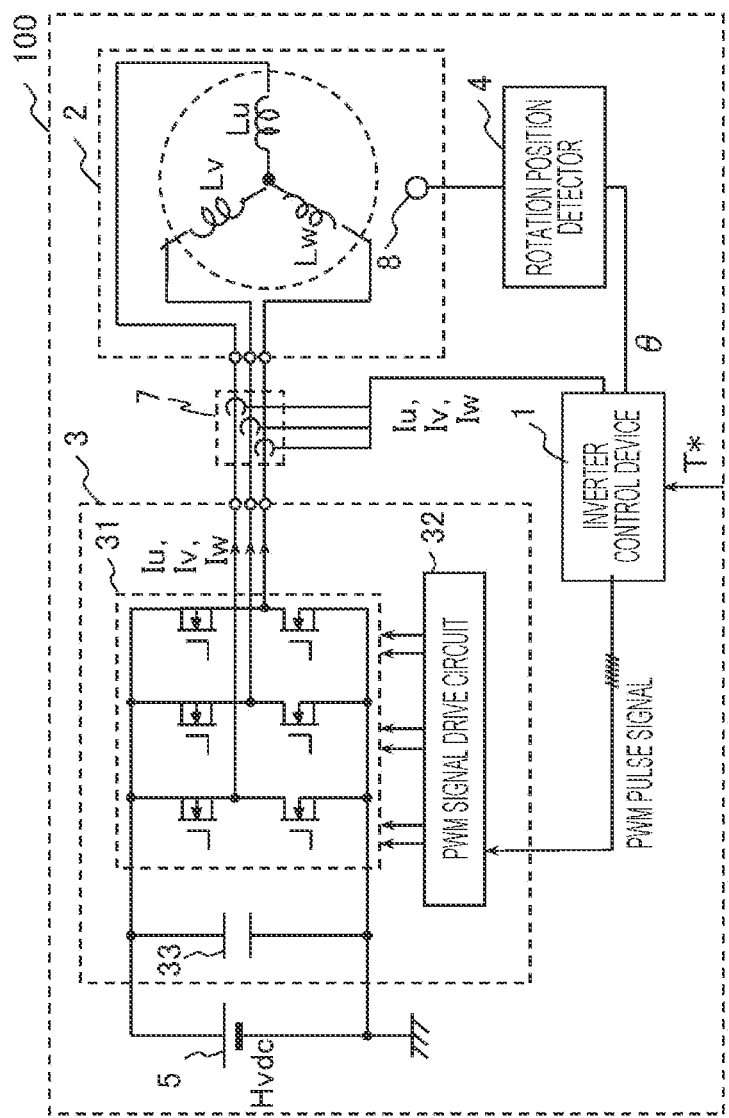
FIG. 1 is a diagram illustrating an overall configuration of a motor drive system including an inverter control device according to an embodiment of the present invention.

FIG. 1 is a diagram illustrating an overall configuration of a motor drive system including an inverter control device according to an embodiment of the present invention. In FIG. 1, a motor drive system 100 includes an inverter control device 1, a motor 2, an inverter 3, a rotational position detector 4, a high-voltage battery 5, and a current detection unit 7.

A rotational position θ of the motor 2 is input from the rotational position detector 4 to the inverter control device 1. Iu, Iv, and Iw indicating three-phase alternating currents flowing in the motor 2 are input from the current detection unit 7, and a torque command T* is input from a host control device (not illustrated). The inverter control device 1 generates a PWM pulse signal for driving the plurality of switching elements included in the inverter 3 based on the input information and outputs the PWM pulse signal to the inverter 3. Accordingly, an operation of the inverter 3 is controlled to rotationally drive the motor 2. Details of the inverter control device 1 will be described below.

The inverter 3 includes an inverter circuit 31, a PWM signal drive circuit 32, and a smoothing capacitor 33. The PWM signal drive circuit 32 generates a gate drive signal for controlling each switching element included in the inverter circuit 31 based on the PWM pulse signal input from the inverter control device 1 and outputs the gate drive signal to the inverter circuit 31. The inverter circuit 31 includes switching elements respectively corresponding to upper and lower arms of the U, V, and W phases. By switching and driving these switching elements in accordance with the gate drive signal input from the PWM signal drive circuit 32, direct-current power supplied from the high-voltage battery 5 is converted into alternating-current power and is output to the motor 2. The smoothing capacitor 33 smooths the direct-current power supplied from the high-voltage battery 5 to the inverter circuit 31.

The high-voltage battery 5 is a direct-current voltage source of the motor drive system 100, and outputs a power supply voltage Hvdc to the inverter 3. The power supply voltage Hvdc of the high-voltage battery 5 is converted to have a variable frequency by the inverter circuit 31 and the PWM signal drive circuit 32 of the inverter 3, and to be a pulsed three-phase alternating-current voltage having a variable frequency, and is applied to the motor 2 as a line voltage. Accordingly, alternating-current power is supplied from the inverter 3 to the motor 2 based on the direct-current power of the high-voltage battery 5. The power supply voltage Hvdc of the high-voltage battery 5 varies depending on a charging state of the high-voltage battery 5.

The motor 2 is a three-phase motor rotationally driven by alternating-current power supplied from the inverter 3, and includes a stator and a rotor. In the embodiment, an example in which a permanent magnet synchronous motor is used as the motor 2 will be described, but another type of motor 2 such as an induction motor or a synchronous reluctance motor may be used. When the alternating-current power input from the inverter 3 is applied to the three-phase coils Lu, Lv, and Lw provided in the stator, there is conduction of the three-phase alternating-current currents Iu, Iv, and Iw in the motor 2, and a magnetic flux is generated in each coil. When an attractive force and a repulsive force are generated between the magnetic flux of each coil and the magnetic flux of the permanent magnet disposed in the rotor, a torque is generated in the rotor, and the motor 2 is rotationally driven.

A rotational position sensor 8 that detects the rotational position θ of the rotor is fitted in the motor 2. The rotational position detector 4 calculates the rotational position θ from an input signal of the rotational position sensor 8. A calculation result of the rotational position θ by the rotational position detector 4 is input to the inverter control device 1 and is used for phase control of the alternating-current power performed by the inverter control device 1 by generating the PWM pulse signal in accordance with a phase of the induced voltage of the motor 2.

Here, a resolver including an iron core and a winding is more appropriate as the rotational position sensor 8, but a sensor using a magnetoresistive element such as a GMR sensor or a Hall element may be used. Any sensor can be used as the rotational position sensor 8 as long as a magnetic pole position of the rotor can be measured. The rotational position detector 4 may estimate the rotational position θ by using the three-phase alternating-current currents Iu, Iv, and Iw flowing in the motor 2 and three-phase alternating-current voltages Vu, Vv, and Vw applied from the inverter 3 to the motor 2 without using the input signal from the rotational position sensor 8.

The current detection unit 7 is disposed in a current path between the inverter 3 and the motor 2. The current detection unit 7 detects three-phase alternating currents Iu, Iv, and Iw (U-phase alternating-current current Iu, V-phase alternating-current current Iv, and W-phase alternating-current current Iw) that electrify the motor 2. The current detection unit 7 is configured using, for example, a Hall current sensor or the like. Detection results of the three-phase alternating-current currents Iu, Iv, and Iw from the current detection unit 7 are input to the inverter control device 1 and are used for the inverter control device 1 to generate a PWM pulse signal. FIG. 1 illustrates an example in which the current detection unit 7 includes three current detectors, but two current detectors may be provided, and the alternating current of the remaining one phase may be calculated since a sum of the three-phase alternating currents Iu, Iv, and Iw is zero. The pulsed direct current flowing from the high-voltage battery 5 to the inverter 3 may be detected by a shunt resistor or the like inserted between the smoothing capacitor 33 and the inverter 3, and the three-phase alternating current Iu, Iv, and Iw may be obtained based on the direct-current current and the three-phase alternating current voltages Vu, Vv, and Vw applied from the inverter 3 to the motor 2.

Figure 2:
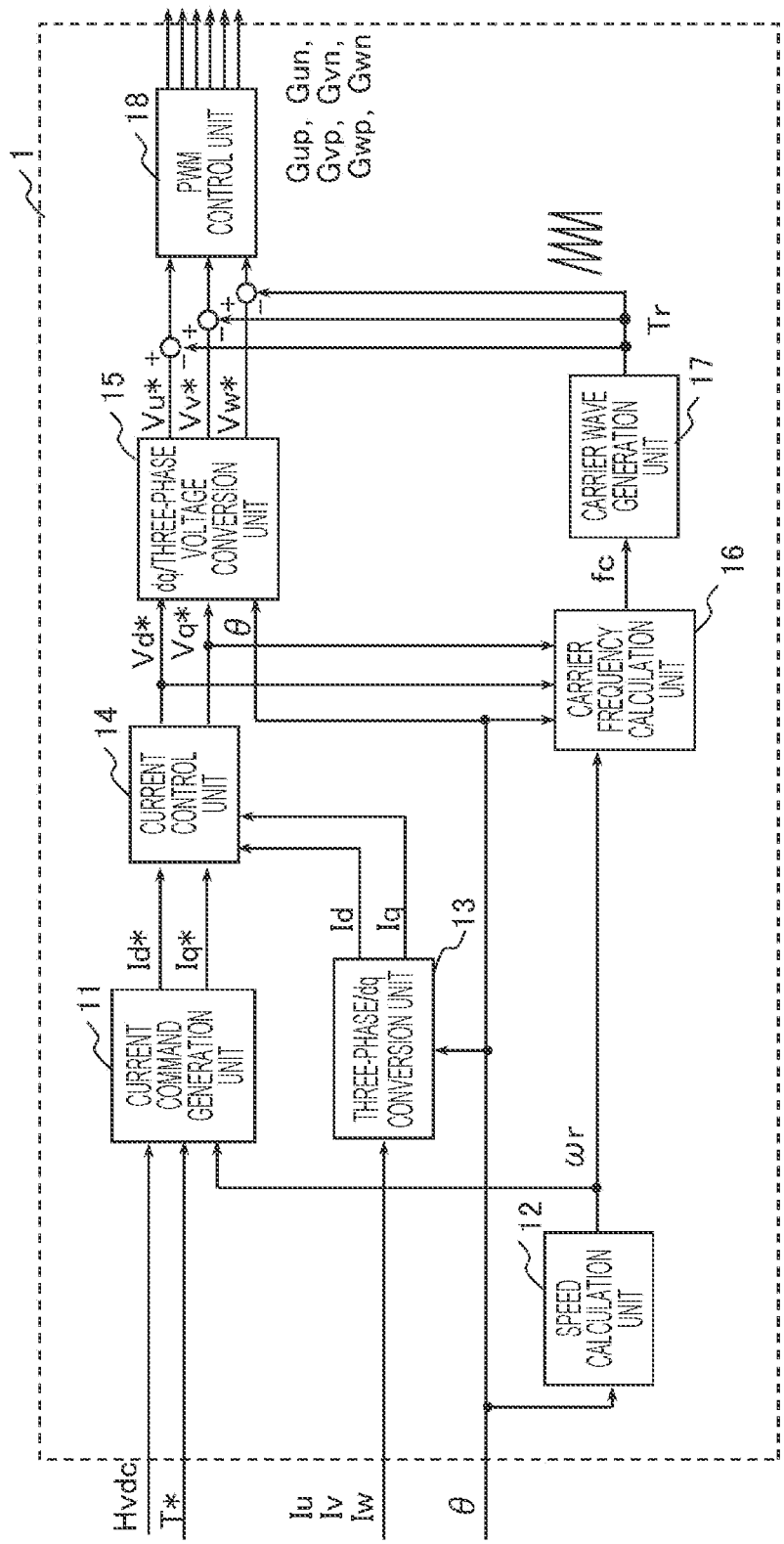
FIG. 2 is a block diagram illustrating a functional configuration of an inverter control device according to an embodiment of the present invention.

Next, details of the inverter control device 1 will be described. FIG. 2 is a block diagram illustrating a functional configuration of the inverter control device 1 according to an embodiment of the present invention.

As illustrated in FIG. 2, the inverter control device 1 includes functional blocks of a current command generation unit 11, a speed calculation unit 12, a three-phase/dq conversion unit 13, a current control unit 14, a dq/three-phase voltage conversion unit 15, a carrier frequency calculation unit 16, a carrier wave generation unit 17, and a PWM control unit 18. The inverter control device 1 includes, for example, a microcomputer, and can implement these functional blocks by executing a predetermined program in the microcomputer. Alternatively, some or all of these functional blocks may be implemented using a hardware circuit such as a logic IC or an FPGA.

The current command generation unit 11 calculates a d-axis current command Id* and a q-axis current command Iq* based on the input torque command T* and the power supply voltage Hvdc. Here, for example, the d-axis current command Id* and the q-axis current command Iq* in accordance with the torque command T* are obtained using a preset current command map, a mathematical expression indicating a relationship between the d-axis current Id and the q-axis current Iq and the motor torque, or the like.

The speed calculation unit 12 calculates a motor rotational speed ωr indicating a rotational velocity (rotational speed) of the motor 2 from a temporal change of the rotational position θ. The motor rotational speed ωr may be a value indicted by one of an angular velocity (rad/s) or a rotational speed (rpm). These values may be mutually converted and used.

The three-phase/dq conversion unit 13 performs dq conversion based on the rotational position θ obtained by the rotational position detector 4 on the three-phase alternating-current currents Iu, Iv, and Iw detected by the current detection unit 7 and calculates a d-axis current value Id and a q-axis current value Iq.

Based on deviations between the d-axis current command Id* and the q-axis current command Iq* output from the current command generation unit 11 and the d-axis current value Id and the q-axis current value Iq output from the three-phase/dq conversion unit 13, the current control unit 14 calculates a d-axis voltage command Vd* and a q-axis voltage command Vq* in accordance with the torque command T* so that these values match with each other. Here, for example, by a control scheme such as PI control, the d-axis voltage command Vd* according to the deviation between the d-axis current command Id* and the d-axis current value Id and the q-axis voltage command Vq* according to the deviation between the q-axis current command Iq* and the q-axis current value Iq are obtained.

The dq/three-phase voltage conversion unit 15 performs three-phase conversion based on the rotational position θ obtained by the rotational position detector 4 in response to the d-axis voltage command Vd* and the q-axis voltage command Vq* calculated by the current control unit 14, and calculates three-phase voltage commands Vu*, Vv*, and Vw* (a U-phase voltage command value Vu*, a V-phase voltage command value Vv*, and a W-phase voltage command value Vw*). Accordingly, the three-phase voltage commands Vu*, Vv*, and Vw* according to the torque command T* are generated.

The carrier frequency calculation unit 16 selects one of the synchronous pulse control mode or the asynchronous pulse control mode based on the motor rotational speed ωr obtained by the speed calculation unit 12. The synchronous pulse control mode is a mode in which a frequency of the carrier wave used to generate the PWM pulse signal is changed in accordance with the motor rotational speed ωr. The asynchronous pulse control mode is a mode in which the frequency of the carrier wave is constant regardless of the motor rotational speed ωr. When the synchronous pulse control mode is selected, the carrier frequency calculation unit 16 calculates the carrier frequency fc indicating the frequency of the carrier wave based on the d-axis voltage command Vd* and the q-axis voltage command Vq* generated by the current command generation unit 11, the rotational position θ obtained by the rotational position detector 4, and the motor rotational speed ωr. When the asynchronous pulse control mode is selected, the carrier frequency calculation unit 16 sets a predetermined frequency to the carrier frequency fc. Accordingly, the carrier frequency fc is determined by selecting a mode corresponding to the motor rotational speed ωr. Details of a method of calculating the carrier frequency fc by the carrier frequency calculation unit 16 will be described below.

Based on the carrier frequency fc determined by the carrier frequency calculation unit 16, the carrier wave generation unit 17 generates the carrier wave Tr used in the pulse width modulation performed by the PWM control unit 18 to generate the PWM pulse signal for each of the three-phase voltage commands Vu*, Vv*, and Vw*. The carrier wave Tr may be any of a triangular wave and a sawtooth wave. In the embodiment, a case where the carrier wave Tr is a sawtooth wave will be described, but a similar process can be performed even in the case of a triangular wave.

The PWM control unit 18 performs pulse width modulation on each of the three-phase voltage commands Vu*, Vv*, and Vw* output from the dq/three-phase voltage conversion unit 15 by using the carrier wave Tr output from the carrier wave generation unit 17 to generate a PWM pulse signal for controlling the operation of the inverter 3. Specifically, the PWM pulse signal for the switching element of the inverter 3 is generated for each phase of the U, V, and W phases based on the comparison result between the three-phase voltage commands Vu*, Vv*, and Vw* output from the dq/three-phase voltage conversion unit 15 and the carrier wave Tr output from the carrier wave generation unit 17. At this time, the PWM pulse signals Gup, Gyp, and Gwp of the upper arms of the phases are logically inverted to generate the PWM pulse signals Gun, Gvn, and Gwn of the lower arms. The PWM pulse signal generated by the PWM control unit 18 is output from the inverter control device 1 to the PWM signal drive circuit 32 of the inverter 3, and is converted into a gate drive signal by the PWM signal drive circuit 32. Accordingly, each switching element of the inverter circuit 31 is controlled such that each switching element is turned on or off, and the output voltage of the inverter 3 is adjusted.

Next, an operation of the carrier frequency calculation unit 16 in the inverter control device 1 will be described. As described above, the carrier frequency calculation unit 16 selects one of the synchronous pulse control mode or the asynchronous pulse control mode. When the synchronous pulse control mode is selected, the carrier frequency fc is calculated based on the d-axis voltage command Vd*, the q-axis voltage command Vq*, the rotational position θ, and the motor rotational speed ωr. By sequentially controlling the frequency of the carrier wave Tr generated by the carrier wave generation unit 17 according to the carrier frequency fc, the voltage waveforms of the three-phase voltage commands Vu*, Vv*, and Vw* are adjusted such that a cycle and a phase of the carrier wave Tr have a predetermined relationship.

Figure 3:
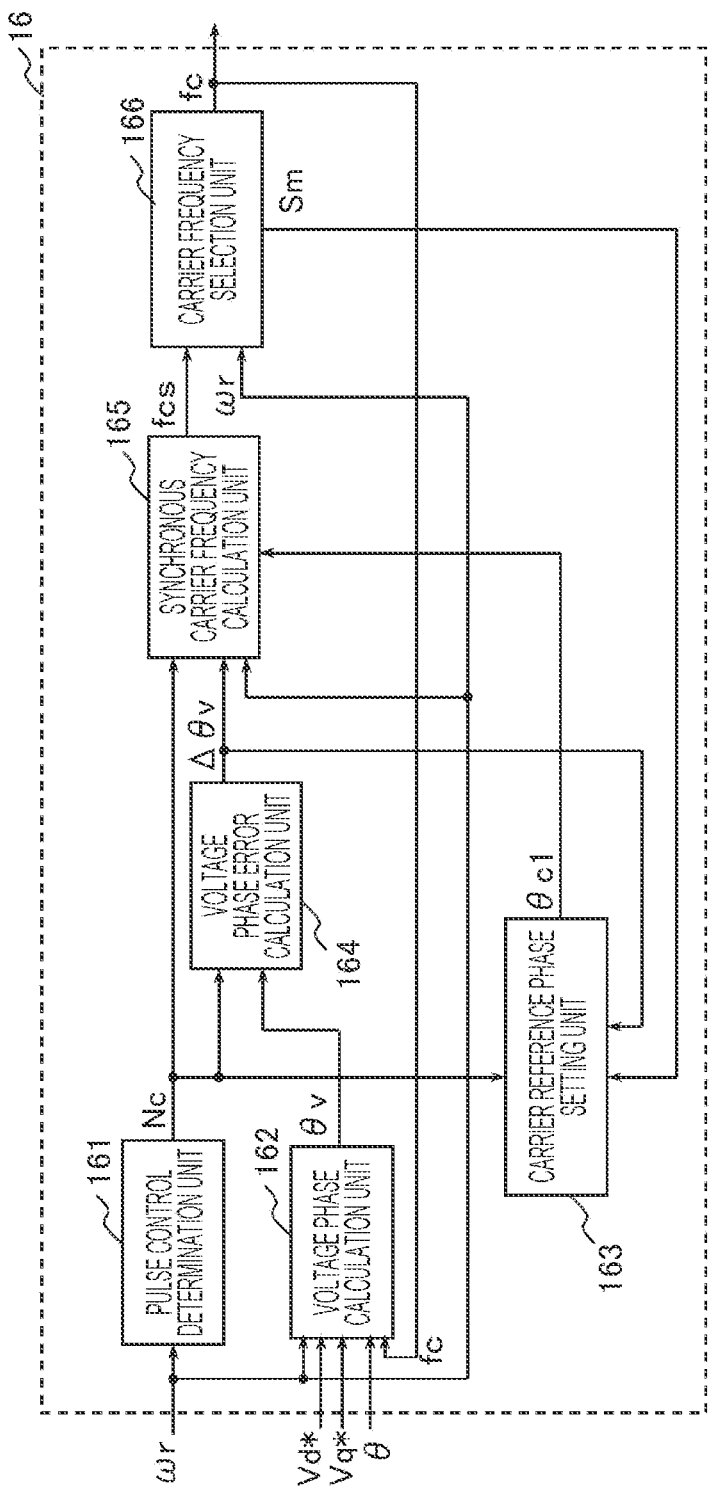
FIG. 3 is a block diagram of a carrier frequency calculation unit according to a first embodiment of the present invention.

FIG. 3 is a block diagram illustrating the carrier frequency calculation unit 16 according to the first embodiment of the present invention. The carrier frequency calculation unit 16 includes a pulse control determination unit 161, a voltage phase calculation unit 162, a carrier reference phase setting unit 163, a voltage phase error calculation unit 164, a synchronous carrier frequency calculation unit 165, and a carrier frequency selection unit 166.

Based on the motor rotational speed or, the pulse control determination unit 161 determines the number of pulses of the carrier wave per cycle of the voltage command in the synchronous PWM control, that is, the number of synchronous pulses Nc indicating a magnification of the carrier frequency fc to the three-phase voltage commands Vu*, Vv*, and Vw*. For example, the pulse control determination unit 161 can determine the number of synchronous pulses Nc such that Nc=15 when the motor rotational speed ωr is relatively low and Nc=9 when the motor rotational speed ωr is relatively high.

The voltage phase calculation unit 162 calculates the voltage phase θv by the following Equations (1) to (4) based on the d-axis voltage command Vd*, the q-axis voltage command Vq*, the rotational position θ, the motor rotational speed or, and the carrier frequency fc. The voltage phase θv indicates the phases of the three-phase voltage commands Vu*, Vv*, and Vw*, which are voltage commands for the inverter 3.

$$\theta v = \theta + \varphi v + \varphi dqv + 0.5\pi \tag{1}$$

$$\varphi v = \omega r \cdot 1.5 Tc \tag{2}$$

$$Tc = 1/fc \tag{3}$$

$$\varphi dqv = a\tan(Vq/Vd) \tag{4}$$

Here, φv indicates a calculation delay compensation value of a voltage phase, Tc indicates a period of the carrier wave Tr, and φdqv indicates a voltage phase from the d-axis. The calculation delay compensation value φv is a value that compensates for occurrence of a calculation delay corresponding to 1.5 control cycles while the rotational position detector 4 acquires the rotational position θ and then the inverter control device 1 outputs a gate signal to the inverter 3. In the embodiment, 0.5π is added in the fourth term on the right side of Expression (1). Since the voltage phase calculated in the first to third terms on the right side of Expression (1) is a cos wave, this expression is a calculation for performing viewpoint conversion of the cos wave into a sin wave.

The carrier reference phase setting unit 163 sets a carrier reference phase θc1 that is a reference value of the phase of the carrier wave Tr based on the number of synchronous pulses Nc determined by the pulse control determination unit 161 and a voltage phase error Δθv calculated by the voltage phase error calculation unit 164. At this time, the carrier reference phase setting unit 163 sets the carrier reference phase θc1 to a value with torque ripple occurring in the motor 2 can be reduced as much as possible at the time of switching from the asynchronous pulse control mode to the synchronous pulse control mode based on a mode selection signal Sm output from the carrier frequency selection unit 166. A specific method of setting the carrier reference phase θc1 by the carrier reference phase setting unit 163 will be described below.

The voltage phase error calculation unit 164 calculates the voltage phase error Δθv by the following Expressions (5) and (6) based on the number of synchronous pulses Nc and the voltage phase θv.

$$\Delta\theta v = \text{mod}(\theta v/\theta vc1) \tag{5}$$

$$\theta vc1 = 2\pi/Nc \tag{6}$$

Here, the value of θvc1 obtained by Expression (6) corresponds to a change amount of the voltage phase θv per cycle of the carrier wave Tr. In Expression (5), mod indicates a remainder operation.

The voltage phase error Δθv obtained by Expression (5) represents the position of the voltage phase θv with respect to one cycle of the carrier wave Tr. In other words, the voltage phase error Δθv indicates a relative phase difference between the three-phase voltage commands Vu*, Vv*, and Vw* that are voltage commands for the inverter 3 and the carrier wave Tr used for pulse width modulation.

The synchronous carrier frequency calculation unit 165 calculates a synchronous carrier frequency fcs by the following Expressions (7) and (8) based on the voltage phase error Δθv calculated by the voltage phase error calculation unit 164, the motor rotational speed or, the number of synchronous pulses Nc, and the carrier reference phase θc1 set by the carrier reference phase setting unit 163.

$$fcs = \omega r \cdot Nc \cdot (1 + \Delta\theta c \cdot K)/(2\pi) \tag{7}$$

$$\Delta\theta c = \Delta\theta v \cdot Nc - \theta c1 \tag{8}$$

The carrier phase error $\Delta\theta c$ obtained by Expression (8) indicates how much the value obtained by replacing the voltage phase error $\Delta\theta v$ with the phase of the carrier wave deviates from the carrier reference phase $\theta c1$. In other words, the carrier phase error $\Delta\theta c$ indicates a difference between the carrier reference phase $\theta c1$ and the phase of the carrier wave Tr obtained using the three-phase voltage commands Vu*, Vv*, and Vw* as references.

The synchronous carrier frequency calculation unit 165 can calculate the synchronous carrier frequency fcs based on Expressions (7) and (8), for example, by phase locked loop (PLL) control. In Expression (7), a gain K may be constant or may be variable in accordance with conditions.

When the synchronous pulse control mode is selected, the voltage phase error calculation unit 164 calculates the voltage phase error $\Delta\theta v$ by Expressions (5) and (6) at each predetermined calculation cycle, and the synchronous carrier frequency calculation unit 165 calculates the synchronous carrier frequency fcs by Expressions (7) and (8) at each predetermined calculation cycle using a calculation result. Accordingly, the carrier frequency calculation unit 16 can adjust the frequency of the carrier wave Tr such that the number of carrier waves Tr included for one cycle of the voltage command matches the number of synchronous pulses Nc while matching the phase of the carrier wave Tr obtained using the voltage command for the inverter 3 a reference with the carrier reference phase $\theta c1$.

The carrier frequency selection unit 166 selects one of the synchronous pulse control mode or the asynchronous pulse control mode based on the motor rotational speed $\omega r$. In accordance with a mode selection result, one of the synchronous carrier frequency fcs calculated by the synchronous carrier frequency calculation unit 165 and the predetermined asynchronous carrier frequency fcns is selected and output as a carrier frequency fc. That is, when the synchronous pulse control mode is selected, the carrier frequency selection unit 166 outputs the synchronous carrier frequency fcs as the carrier frequency fc. Conversely, when the asynchronous pulse control mode is selected, the carrier frequency selection unit 166 outputs the asynchronous carrier frequency fcns as a carrier frequency fcns. Here, the asynchronous carrier frequency fcns is a constant value set in advance by the carrier frequency selection unit 166. Further, the carrier frequency selection unit 166 outputs the mode selection signal Sm indicating whether the synchronous pulse control mode or the asynchronous pulse control mode is selected in accordance with a mode selection result based on the motor rotational speed $\omega r$.

Figure 4:
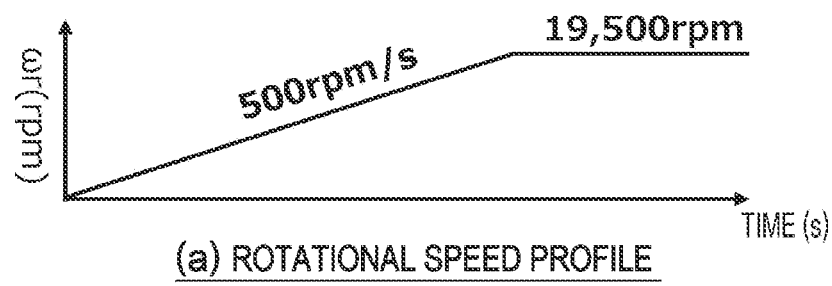
FIG. 4 is a diagram illustrating an operation example of a carrier frequency selection unit.
Figure 4:
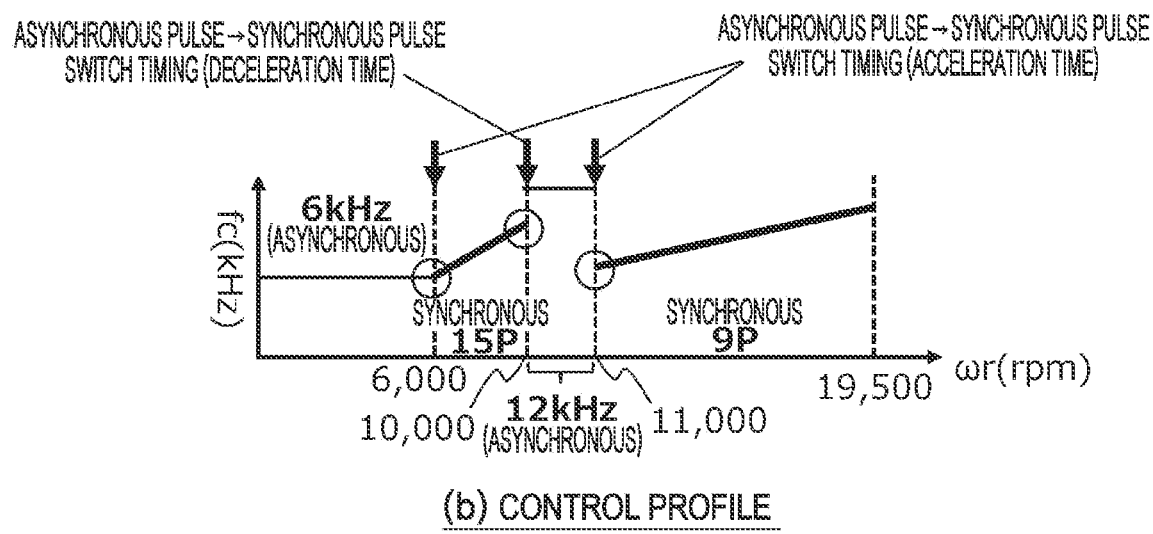

A specific operation example of the carrier frequency selection unit 166 will be described below with reference to FIG. 4. FIG. 4 is a diagram illustrating an operation example of the carrier frequency selection unit 166.

FIG. 4(a) illustrates an example of a rotational speed profile indicating a temporal change of the motor rotational speed $\omega r$. For example, as illustrated in FIG. 4(a), in the motor drive system 100, the motor rotational speed $\omega r$ increases or decreases at a rate of 500 (rpm/s) and becomes constant when motor rotational speed reaches 19500 (rpm).

FIG. 4(b) is an example of a control profile of the carrier frequency fc based on the motor rotational speed $\omega r$. The carrier frequency selection unit 166 controls the carrier frequency fc, as illustrated in FIG. 4(b), for example, in accordance with the motor rotational speed $\omega r$ that changes as described above in accordance with the rotational speed profile of FIG. 4(a). That is, when the motor rotation speed or is less than 6000 (rpm), the asynchronous pulse control mode is selected, and the carrier frequency is controlled to be constant fc=6 (kHz). On the other hand, when the motor rotational speed $\omega r$ is within a range of 6000 to 10000 (rpm) or within a range of 11000 to 19500 (rpm), the carrier frequency fc is controlled to be changed in accordance with the motor rotational speed $\omega r$ by selecting the synchronous pulse control mode and setting the number of synchronous pulses to Nc=15 and 9, respectively. However, in order to avoid mechanical resonance caused by a mounting structure of the motor 2 or the like, when the motor rotational speed $\omega r$ is within a range of 10000 to 11000 (rpm), the asynchronous pulse control mode is selected, and the carrier frequency is controlled to be constant fc=12 (kHz).

When the carrier frequency selection unit 166 controls the carrier frequency fc as described above, at the time of a speed increase in the motor 2, that is, at the time of an increase in the motor rotational speed or, the mode is switched from the asynchronous pulse control mode to the synchronous pulse control mode at $\omega r$=6000 or 11000 (rpm). Conversely, when the motor 2 decelerates, that is, when the motor rotational speed $\omega r$ decreases, the mode is switched from the asynchronous pulse control mode to the synchronous pulse control mode at or =10000 (rpm).

The carrier frequency calculation unit 16 according to the embodiment can control the carrier frequency fc by selecting one of the synchronous pulse control mode or the asynchronous pulse control mode by performing the above-described process in each block.

Next, details of a method of setting the carrier reference phase $\theta c1$ in the carrier reference phase setting unit 163 of the carrier frequency calculation unit 16 will be described.

Figure 5:
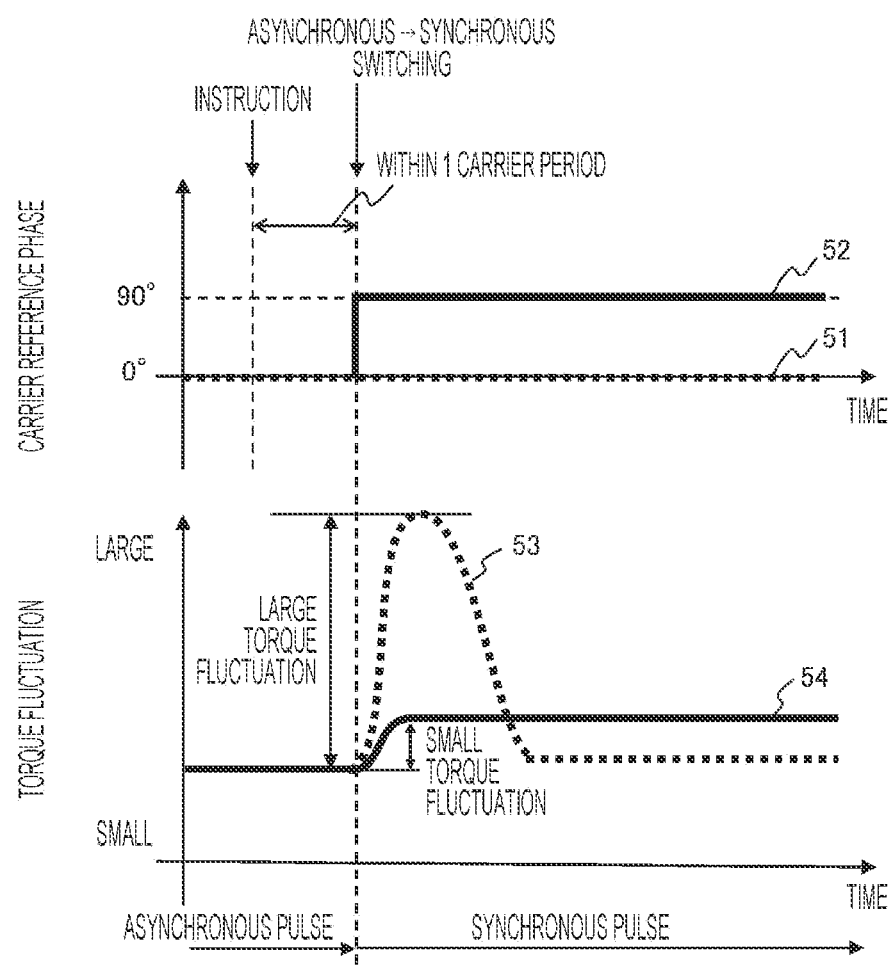
FIG. 5 is a diagram illustrating an example of a carrier reference phase and a torque fluctuation at the time of switching from an asynchronous pulse control mode to a synchronous pulse control mode according to the first embodiment of the present invention.

FIG. 5 is a diagram illustrating an example of the carrier reference phase and the torque fluctuation at the time of switching from the asynchronous pulse control mode to the synchronous pulse control mode according to the first embodiment of the present invention. In an inverter control device of the related art, the carrier reference phase $\theta c1$ is fixed at 0°, for example, as illustrated in a graph 51 at the time of switching from the asynchronous pulse control mode to the synchronous pulse control mode. In this case, in accordance with the value of the voltage phase $\theta v$ at the time of switching, the value of the carrier phase error $\Delta\theta c$ obtained by the above-described Expression (8) increases immediately after the switching, and the synchronous carrier frequency fcs obtained by the Expression (7) temporarily considerably fluctuates. As a result, a large torque fluctuation occurs as illustrated in a graph 53.

On the other hand, in the inverter control device 1 according to the embodiment, at the time of switching from the asynchronous pulse control mode to the synchronous pulse control mode, for example, as illustrated in a graph 52, the value of the carrier reference phase $\theta c1$ set in the carrier reference phase setting unit 163 is changed from 0° to 90°. Accordingly, the value of the carrier phase error $\Delta\theta c$ immediately after the switching can be reduced, and the fluctuation of the synchronous carrier frequency fcs can be suppressed. As a result, as illustrated in the graph 54, the torque fluctuation can be suppressed as compared with the conventional inverter control device.

Figure 6:
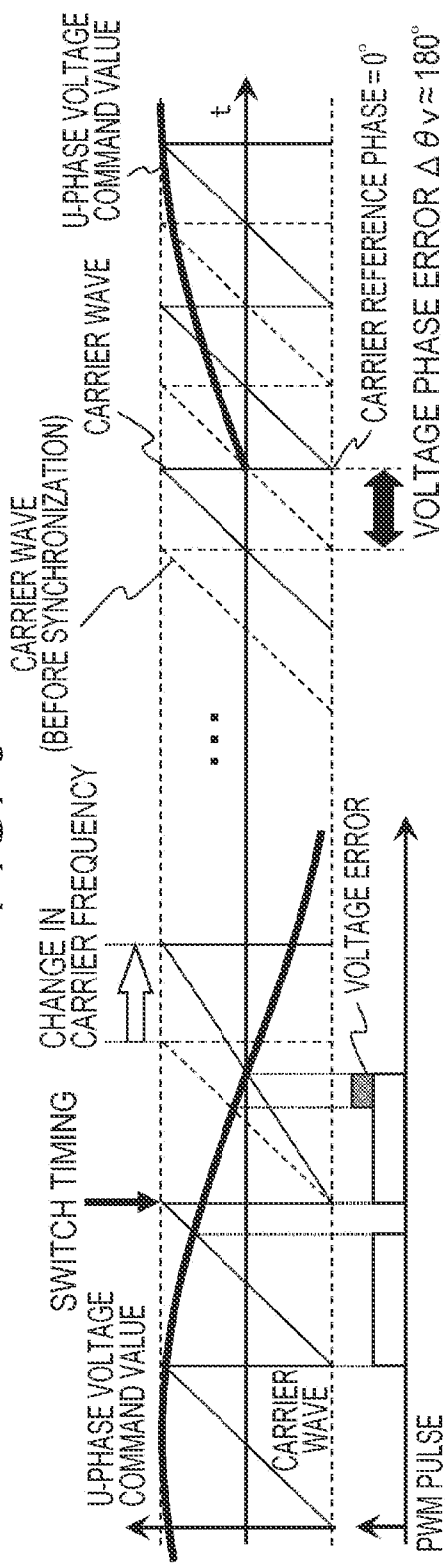
FIG. 6 is a diagram illustrating a change in a synchronous carrier frequency at the time of switching from the asynchronous pulse control mode to the synchronous pulse control mode.
Figure 6:
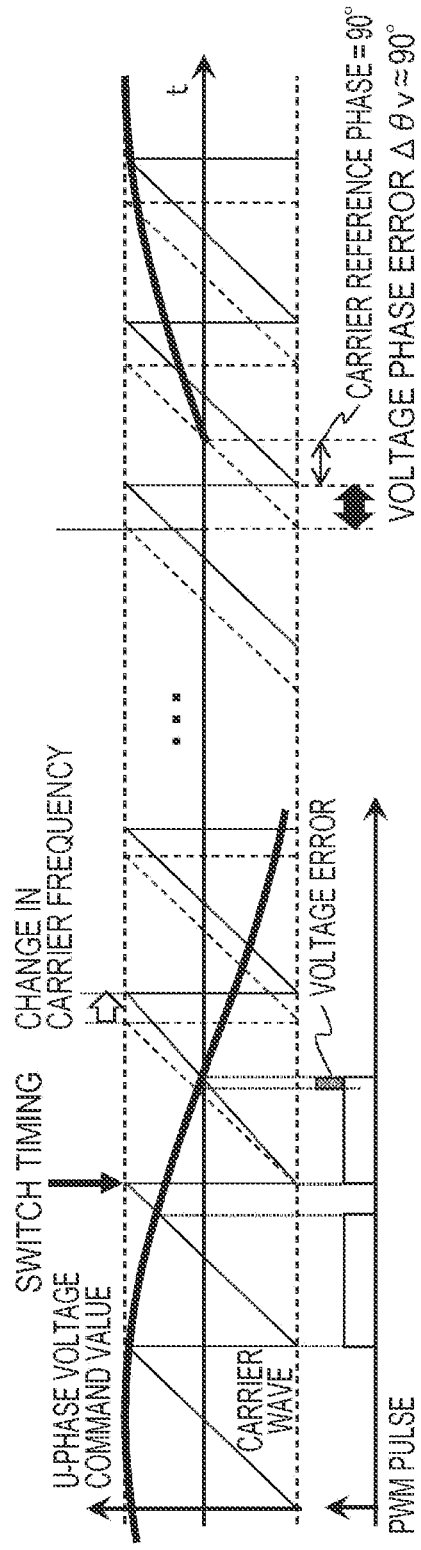

The reason why the fluctuation of the synchronous carrier frequency fcs can be suppressed by changing the value of the carrier reference phase $\theta c1$ at the time of switching from the asynchronous pulse control mode to the synchronous pulse control mode as described above will be described below with reference to FIG. 6.

The synchronous carrier frequency calculation unit 165 calculates a carrier phase error $\Delta\theta c$ indicating a difference between the phase of the carrier wave Tr and the carrier reference phase θc1 by the above-described Expression (8). When the carrier frequency selection unit 166 switches the mode from the asynchronous pulse control mode to the synchronous pulse control mode, the value of the carrier frequency fc is switched from the asynchronous carrier frequency fcns to the synchronous carrier frequency fcs. At this time, the synchronous carrier frequency calculation unit 165 adjusts the value of the carrier frequency fc (the synchronous carrier frequency fcs) by Expression (7) so that the phase of the carrier wave Tr matches the carrier reference phase δc1 based on the carrier phase error Δθc.

Here, when the carrier reference phase δc1 is fixed at 0° as in the inverter control device of the related art described with reference to FIG. 5, the value of the carrier phase error Δθc may increase immediately after the switching depending on the value of the voltage phase θv at the time of switching. For example, when the value of the voltage phase error Δθv obtained from the value of the voltage phase θv at the time of switching is Δθv≈180°, as illustrated in FIG. 6(a), the carrier frequency fc immediately after the switching considerably changes, and thus a deviation may occur in the waveform of the carrier wave Tr. Such the deviation in the waveform of the carrier wave Tr becomes an error of the PWM pulse signal generated in the PWM control unit 18, and causes an error in the output voltage of the inverter 3. As a result, the above-described torque fluctuation occurs in the motor 2.

On the other hand, in the inverter control device 1 according to the embodiment, the value of the carrier reference phase θc1 set in the carrier reference phase setting unit 163 is changed at the time of switching from the asynchronous pulse control mode to the synchronous pulse control mode. Specifically, for example, as described with reference to FIG. 5, the value of the carrier reference phase θc1 is changed from 0° to 90°. Accordingly, the value of the voltage phase error Δθv obtained from the value of the voltage phase θv at the time of switching is reduced to Δθv≈90°. As illustrated in FIG. 6 (b), the deviation in the waveform of the carrier wave Tr immediately after the switching is made smaller than that in the case of FIG. 6(a). Accordingly, an error of the PWM pulse signal generated by the PWM control unit 18 can be made small, which can inhibit the torque fluctuation of the motor 2.

The carrier reference phase setting unit 163 can determine the value of the changed carrier reference phase θc1 as follows, for example.

When it is detected that the switching from the asynchronous pulse control mode to the synchronous pulse control mode is performed with the mode selection signal Sm output from the carrier frequency selection unit 166, the carrier reference phase setting unit 163 acquires the value of the voltage phase error Δθv immediately before the switching from the voltage phase error calculation unit 164. The value of the voltage phase error Δθv indicates a relative phase difference between the three-phase voltage commands Vu*, Vv*, and Vw* and the carrier wave Tr output in the asynchronous pulse control mode. The carrier reference phase setting unit 163 obtains a carrier reference phase determination value Δθcd expressed by the following Expression (9) from the acquired value of the voltage phase error Δθv immediately before the switching.

$$\Delta\theta cd = \Delta\theta v \cdot Nc \quad (9)$$

The carrier reference phase setting unit 163 determines the set value of the carrier reference phase θc1 using the determination conditions of the following Expressions (10) to (13) based on the obtained value of the carrier reference phase determination value Δθcd.

$$315° \le \Delta\theta cd \Delta\theta cd < 45° | \theta c1 = 0° \quad (10)$$

$$5° \le \Delta\theta cd < 135° | \theta c1 = 90° \quad (11)$$

$$5° \le \Delta\theta cd < 225° | \theta c1 = 180° \quad (12)$$

$$225° \le \Delta\theta cd < 315° | \theta c1 = 270° \quad (13)$$

The carrier reference phase setting unit 163 can set the carrier reference phase θc1 by the above-described method.

According to the above-described first embodiment of the present invention, the following operational advantageous effects are achieved.

(1) The inverter control device 1 controls the inverter 3 to rotationally drive the motor 2 by generating a PWM pulse signal for driving a plurality of switching elements included in the inverter 3 by pulse width modulation and outputting the PWM pulse signal to the inverter 3. The inverter control device 1 performs pulse width modulation by selecting one of the synchronous pulse control mode in which the frequency fc of the carrier wave Tr used in the pulse width modulation is changed in accordance with the rotation speed of the motor 2 and the asynchronous pulse control mode in which the carrier frequency fc is constant regardless of the rotation speed of the motor 2. Then, at the time of switching from the asynchronous pulse control mode to the synchronous pulse control mode, the carrier reference phase θc1 that is a reference value of the phase of the carrier wave Tr is changed to a different value before and after the switching. In this way, the motor 2 can be stably controlled while the asynchronous pulse control is immediately switched to the synchronous pulse control.

(2) The inverter control device 1 includes the pulse control determination unit 161, the carrier reference phase setting unit 163, the voltage phase error calculation unit 164, the synchronous carrier frequency calculation unit 165, the carrier frequency selection unit 166, the carrier wave generation unit 17, and the PWM control unit 18. The pulse control determination unit 161 determines the number of synchronous pulses Nc indicating the number of pulses of the carrier wave Tr per cycle of the voltage command in the synchronous pulse control mode based on the motor rotational speed ωr indicating the rotational speed of the motor 2. The carrier reference phase setting unit 163 sets the carrier reference phase θc1. The voltage phase error calculation unit 164 calculates the voltage phase error Δθv indicating a relative phase difference between the voltage command and the carrier wave Tr based on the number of synchronous pulses Nc determined by the pulse control determination unit 161 and the voltage phase θv indicating the phase of the voltage command to the inverter 3. The synchronous carrier frequency calculation unit 165 determines the synchronous carrier frequency fcs that is the frequency of the carrier wave Tr in the synchronous pulse control mode, based on the voltage phase error Δθv calculated by the voltage phase error calculation unit 164 and the carrier reference phase θc1 set by the carrier reference phase setting unit 163. The carrier frequency selection unit 166 selects one of the synchronous carrier frequency fcs determined by the synchronous carrier frequency calculation unit 165 or the asynchronous carrier frequency fcns that is a predetermined frequency of the carrier wave Tr. The carrier wave generation unit 17 generates the carrier wave Tr at the frequency selected by the carrier frequency selection unit 166. The PWM control unit 18 generates the PWM pulse signal by performing pulse width modulation using the carrier wave Tr generated by the carrier wave generation unit 17 and the three-phase voltage commands Vu*, Vv*, and Vw*. In this way, it is possible to implement the generation of the PWM pulse signal in each control mode while arbitrarily switching between the asynchronous pulse control and the synchronous pulse control.

(3) The inverter control device 1 generates the carrier wave Tr in accordance with the number of signals corresponding to the number of phases of the alternating-current current output from the inverter 3 to the motor 2. Specifically, for example, the carrier wave Tr is generated for each of the three-phase voltage commands Vu*, Vv*, and Vw* for the inverter 3 that outputs the three-phase alternating current to the motor 2 that is a three-phase motor. In this way, it is possible to generate an appropriate carrier wave for the alternating current of each phase regardless of the number of phases of the inverter.

Second Embodiment

Next, a second embodiment of the present invention will be described. A motor drive system and an inverter control device according to the embodiment have the same configurations as those in FIGS. 1 and 2 described in the first embodiment. Only processing content in the carrier frequency calculation unit 16 is different from that in the first embodiment. Accordingly, the embodiment will be described below with reference to the configurations of FIGS. 1 and 2.

Figure 7:
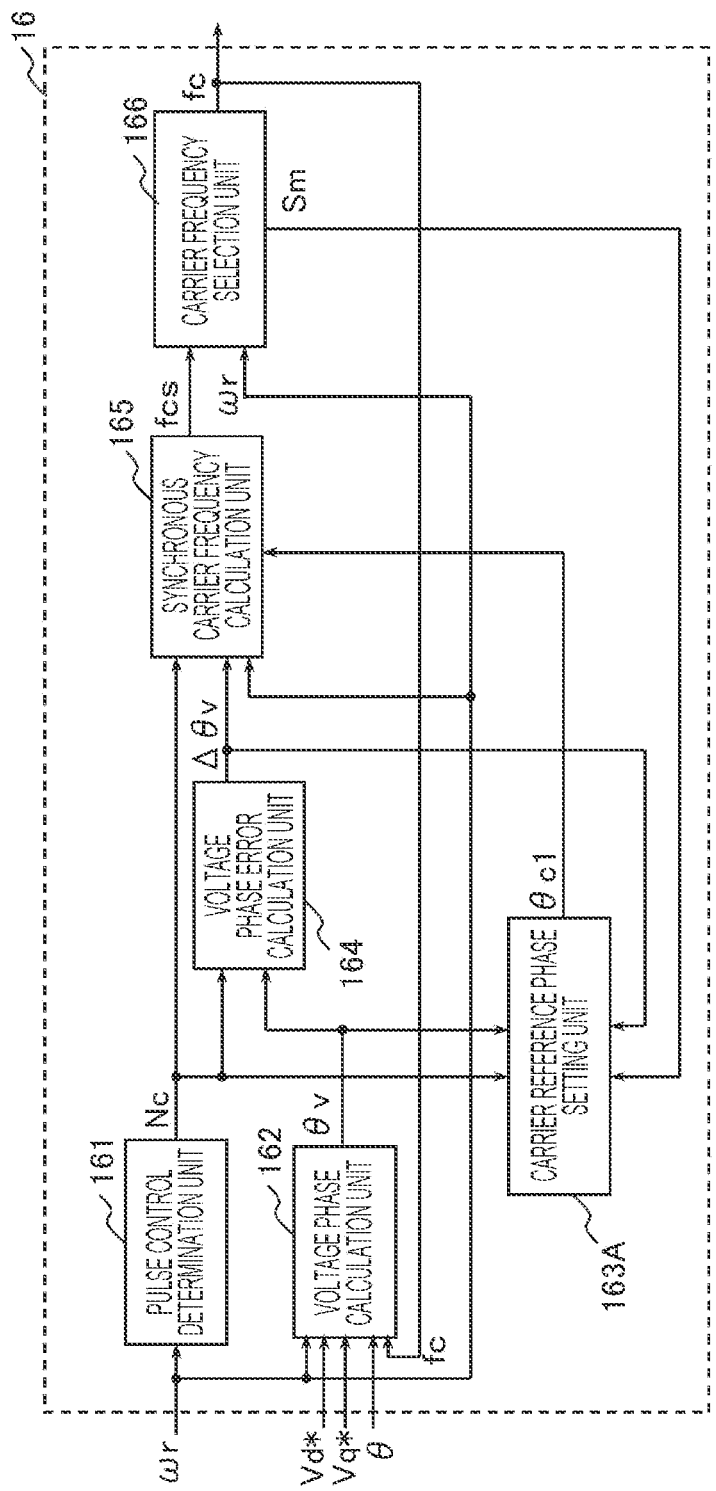
FIG. 7 is a block diagram illustrating a carrier frequency calculation unit according to a second embodiment of the present invention.

FIG. 7 is a block diagram illustrating the carrier frequency calculation unit 16 according to the second embodiment of the present invention. The block diagram of FIG. 7 is different from the block diagram of FIG. 3 described in the first embodiment in that the carrier reference phase setting unit 163 is replaced with a carrier reference phase setting unit 163A. Hereinafter, the embodiment will be described focusing on this difference.

As in the carrier reference phase setting unit 163 described in the first embodiment, the carrier reference phase setting unit 163A sets the carrier reference phase $\theta c1$ based on the number of synchronous pulses Nc determined by the pulse control determination unit 161 and the voltage phase error $\Delta \theta v$ calculated by the voltage phase error calculation unit 164. At this time, the carrier reference phase setting unit 163A changes the value of the carrier reference phase $\theta c1$ a plurality of times based on the voltage phase $\theta v$ at the time of switching from the asynchronous pulse control mode to the synchronous pulse control mode. Accordingly, as compared with the first embodiment, torque ripple occurring in the motor 2 at the time of switching of the mode is further inhibited.

Figure 8:
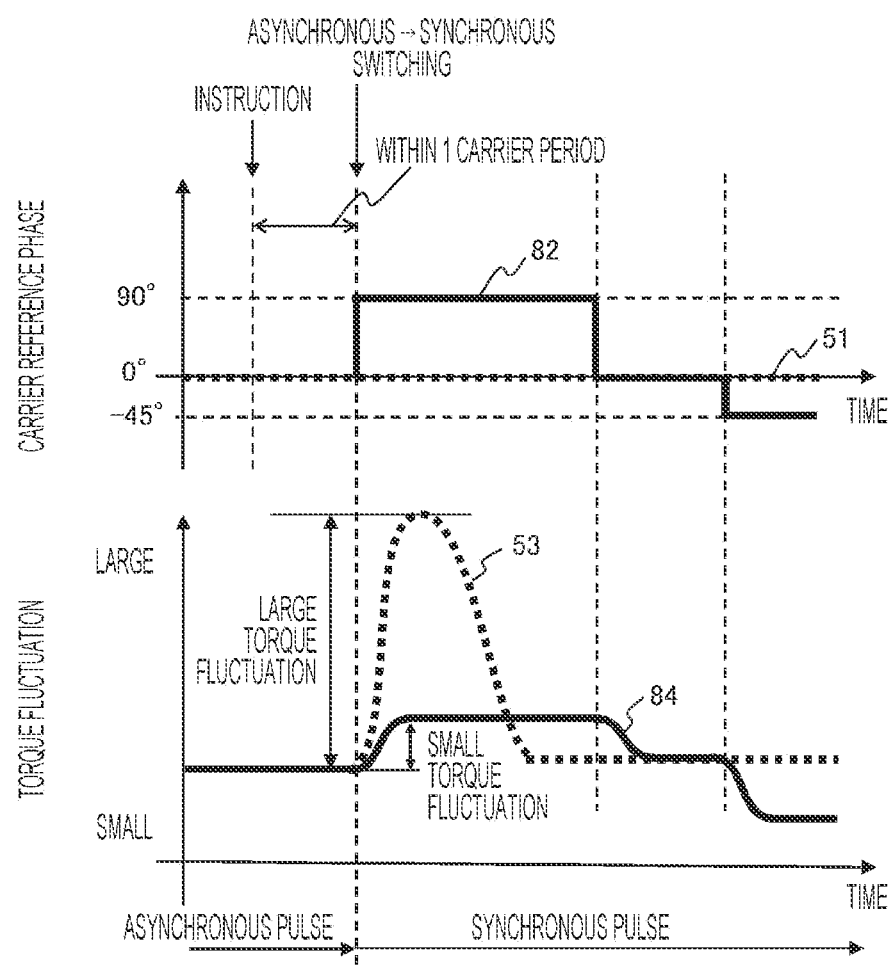
FIG. 8 is a diagram illustrating an example of a carrier reference phase and a torque fluctuation at the time of switching from an asynchronous pulse control mode to a synchronous pulse control mode according to the second embodiment of the present invention.

FIG. 8 is a diagram illustrating an example of the carrier reference phase and the torque fluctuation at the time of switching from the asynchronous pulse control mode to the synchronous pulse control mode in the second embodiment of the present invention. In FIG. 8, graphs 51 and 53 are the same as the graphs 51 and 53 of FIG. 5 described in the first embodiment, respectively. That is, the graph 51 indicates the carrier reference phase $\theta c1$ fixed to 0° at the time of switching in the inverter control device of the related art and the graph 53 indicates a state of a torque fluctuation at the time of switching in the inverter control device of the related art corresponding to the graph 51.

In the inverter control device 1 according to the embodiment, at the time of switching from the asynchronous pulse control mode to the synchronous pulse control mode, for example, as illustrated in a graph 82, the value of the carrier reference phase $\theta c1$ set in the carrier reference phase setting unit 163A is changed from 0° to 90°. Thereafter, the value of the carrier reference phase $\theta c1$ is further changed from 90° to 0°, and subsequently changed from 0° to −45°. A change timing of the carrier reference phase $\theta c1$ can be determined based on the voltage phase $\theta v$.

As described above, in the inverter control device 1 according to the embodiment, the value of the carrier reference phase $\theta c1$ is changed a plurality of times at the time of switching from the asynchronous pulse control mode to the synchronous pulse control mode. Accordingly, as illustrated in the graph 84, torque ripple occurring in the motor 2 immediately after the switching can be reduced. The final value of the carrier reference phase $\theta c1$ at this time can be determined from, for example, an optimum value determined in advance according to the operation state (a rotation speed, torque, a power supply voltage, and the like) of the motor 2.

In the foregoing example, a change amount per time is 90° in each of a first change (0° to 90°) of the carrier reference phase $\theta c1$ and a second change (90° to 0°) of the carrier reference phase $\theta c1$, and a change amount per time is 450 in a third change (0° to −45°) of the carrier reference phase $\theta c1$. As described above, the change amount of the carrier reference phase $\theta c1$ per time in the embodiment is preferably 90° or less. In this way, the carrier reference phase $\theta c1$ can be changed stepwise over a plurality of times until the carrier reference phase $\theta c1$ becomes an optimum value. As a result, it is possible to alleviate a torque fluctuation shock of the motor 2 due to the change in the carrier reference phase $\theta c1$.

According to the above-described second embodiment of the present invention, the inverter control device 1 changes the carrier reference phase $\theta c1$ a plurality of times at the time of switching from the asynchronous pulse control mode to the synchronous pulse control mode. In this way, it is possible to reduce torque ripple occurring in the motor 2 immediately after the switching. The change amount of the carrier reference phase $\theta c1$ per time at this time is preferably 90° or less. In this way, it is possible to alleviate the torque fluctuation shock.

Third Embodiment

Next, a third embodiment of the present invention will be described. As in the above-described second embodiment, the motor drive system and the inverter control device according to the embodiment also have the same configurations as those in FIGS. 1 and 2 described in the first embodiment. Only processing content in the carrier frequency calculation unit 16 is different from that in the first embodiment. Accordingly, the embodiment will be described below with reference to the configurations of FIGS. 1 and 2.

Figure 9:
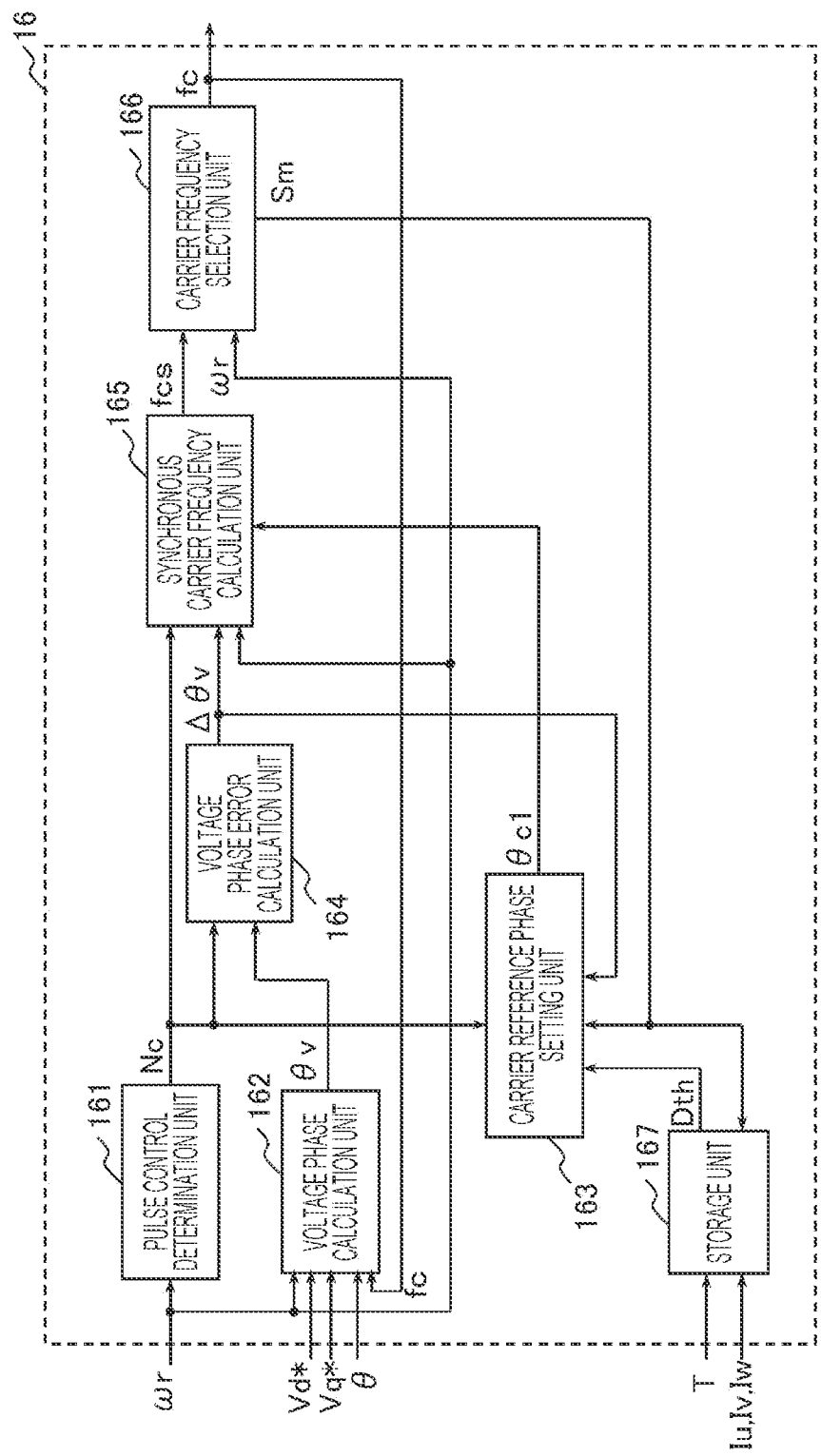
FIG. 9 is a block diagram illustrating a carrier frequency calculation unit according to a third embodiment of the present invention.

FIG. 9 is a block diagram illustrating the carrier frequency calculation unit 16 according to the third embodiment of the present invention. The block diagram of FIG. 9 is different from the block diagram of FIG. 3 described in the first embodiment in that a recording unit 167 is further provided. Hereinafter, the embodiment will be described focusing on this difference.

The torque T of the motor 2 and the three-phase alternating currents Iu, Iv, and Iw are input to the recording unit 167. When the switching from the asynchronous pulse control mode to the synchronous pulse control mode is detected in accordance with the mode selection signal Sm output from the carrier frequency selection unit 166, change amounts in the torque T and the three-phase alternating currents Iu, Iv, and Iw before and after the switching are recorded. The torque T may be measured by, for example, a torque sensor (not illustrated) installed on an output shaft of the motor 2, or may be indirectly obtained from other measured values. The three-phase alternating currents Iu, Iv, and Iw may be measured only for any one phase or two phases, or may be measured for all the three phases. Further, the recording unit 167 does not necessarily record the change amounts in both the torque T and the three-phase alternating currents Iu, Iv, and Iw, and may record at least one of the change amounts.

After the change amounts in the torque T and/or the three-phase alternating currents Iu, Iv, and Iw at the time of switching are recorded as described above, the recording unit 167 determines whether each of these change amounts exceeds a predetermined threshold. As a result, when it is determined that the change amount exceeds the threshold, a determination signal Dth indicating that the change amount exceeds the threshold is output to the carrier reference phase setting unit 163.

In the embodiment, as in the first embodiment, the carrier reference phase setting unit 163 changes the value of the carrier reference phase $\theta c1$ at the time of switching from the asynchronous pulse control mode to the synchronous pulse control mode in accordance with the mode selection signal Sm output from the carrier frequency selection unit 166. At this time, when the determination signal Dth is output from the recording unit 167, the changed carrier reference phase $\theta c1$ is replaced with a value different from that at the time of the previous switching. By repeating this until the determination signal Dth is no longer output from the recording unit 167, the value of the carrier reference phase $\theta c1$ is changed such that the change amount in the torque T and the three-phase alternating currents Iu, Iv, and Iw at the time of switching is less than the threshold.

Figure 10:
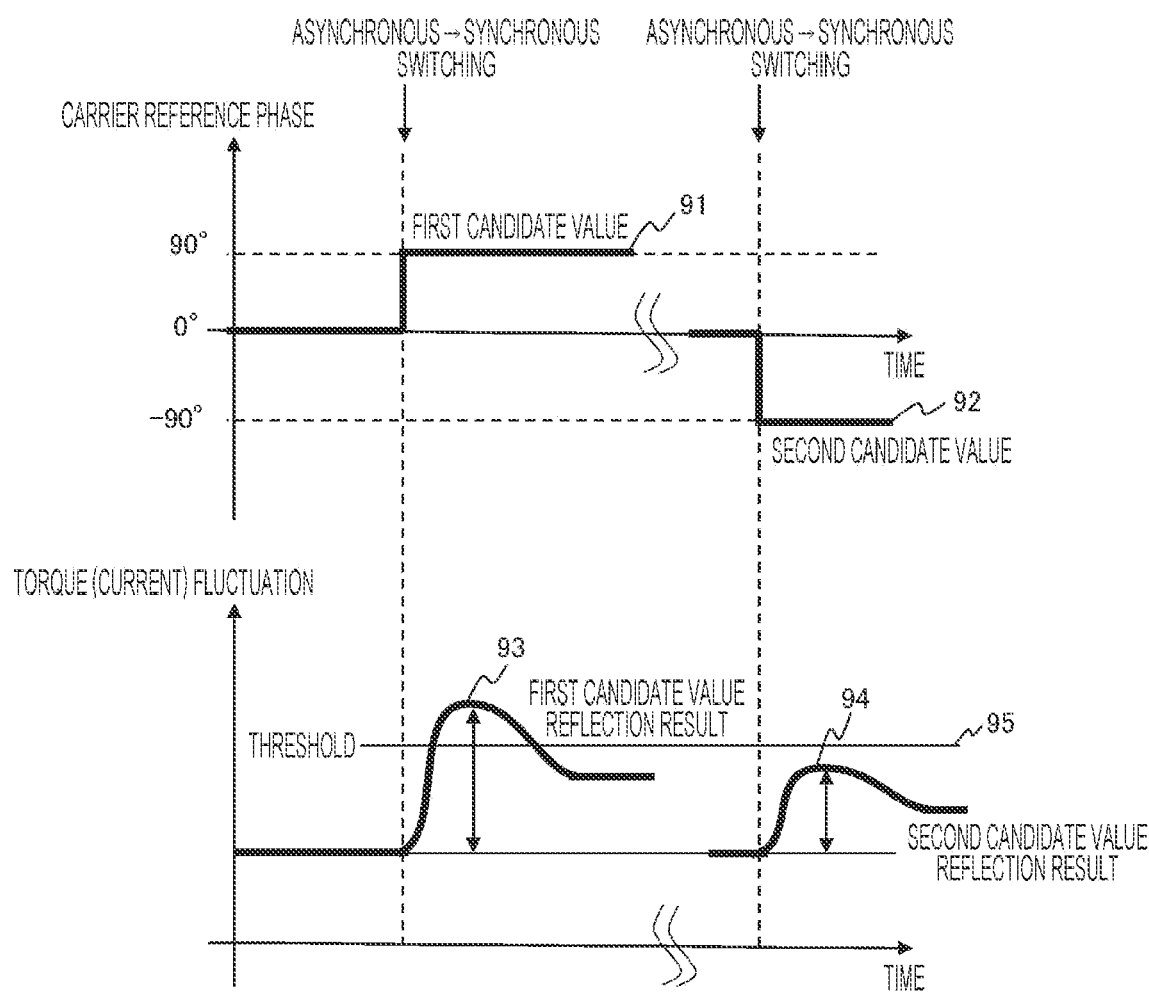
FIG. 10 is a diagram illustrating an example of a carrier reference phase and a torque fluctuation at the time of switching from an asynchronous pulse control mode to a synchronous pulse control mode according to the third embodiment of the present invention.

FIG. 10 is a diagram illustrating an example of a carrier reference phase and a torque fluctuation (or a current fluctuation) at the time of switching from the asynchronous pulse control mode to the synchronous pulse control mode according to the third embodiment of the present invention.

In the inverter control device 1 according to the embodiment, at the time of switching from the asynchronous pulse control mode to the synchronous pulse control mode, for example, as illustrated in a graph 91, a value of the carrier reference phase $\theta c1$ set in the carrier reference phase setting unit 163 is first changed from 0° to 90° which is a first substitute value. The change amount in the torque (or a current) of the motor 2 at this time is recorded in the recording unit 167.

Here, it is assumed that, for the first substitute value of the carrier reference phase $\theta c1$, for example, a change amount as illustrated in a graph 93 is recorded in the recording unit 167 as a change amount of the torque (or a current) of the motor 2 at the time of switching from the asynchronous pulse control mode to the synchronous pulse control mode. The change amount in the graph 93 is equal to or greater than a predetermined threshold 95 set in advance.

In such a case, the recording unit 167 outputs the determination signal Dth to the carrier reference phase setting unit 163 to notify that the change amount of the torque (or the current) at the time of switching exceeds the threshold 95.

When the determination signal Dth is input from the recording unit 167, the carrier reference phase setting unit 163 changes the value of the carrier reference phase $\theta c1$ from 0° to −90° that is the second substitute value, for example, as illustrated in the graph 92 at the time of switching from the asynchronous pulse control mode to the synchronous pulse control mode. The change amount in the torque (or a current) of the motor 2 at this time is recorded in the recording unit 167.

Here, it is assumed that, for the second substitute value of the carrier reference phase $\theta c1$, for example, a change amount as illustrated in a graph 94 is recorded in the recording unit 167 as a change amount of the torque (or a current) of the motor 2 at the time of switching from the asynchronous pulse control mode to the synchronous pulse control mode. Since the change amount of the graph 94 is less than the predetermined threshold 95 set in advance, the recording unit 167 stops outputting the determination signal Dth. Accordingly, even in the subsequent switching, the carrier reference phase setting unit 163 changes the value of the carrier reference phase $\theta c1$ to the second substitute value, so that the change amount of a torque (or a current) at the time of switching can be inhibited.

According to the above-described third embodiment of the present invention, the inverter control device 1 includes the recording unit 167 that records the change amount of at least one of the torque and the current of the motor 2 when the value of the carrier reference phase $\theta c1$ is changed before and after switching from the asynchronous pulse control mode to the synchronous pulse control mode. Then, when the change amount recorded in the recording unit 167 exceeds a predetermined threshold value, the value of the changed carrier reference phase $\theta c1$ is replaced with another value. In this way, the changed value of the carrier reference phase $\theta c1$ can be adjusted to an optimum value capable of inhibiting the torque and the current of the motor 2.

In each of the above-described embodiments, each configuration (FIGS. 2, 3, 7, 9, and the like) in the inverter control device 1 may implement the function of each configuration by a CPU and a program regardless of the configuration by hardware. When each configuration in the inverter control device 1 is implemented by a CPU and a program, there is an advantage that a cost can be reduced because the number of pieces of hardware is reduced. This program can be stored to be provided in advance in a storage medium of the inverter control device. Alternatively, the program may be stored and provided in an independent storage medium, or the program may be recorded and stored in a storage medium of the inverter control device via a network line. The program may be provided as any of various forms of computer-readable computer program products, such as data signals (carrier waves).

The present invention is not limited to the foregoing embodiments, and other forms that are conceivable within the scope of the technical idea of the present invention are also included within the scope of the present invention as long as the features of the present invention are not impaired. A configuration in which the plurality of above-described embodiments are combined may be provided.

REFERENCE SIGNS LIST

1 inverter control device
2 motor 3 inverter
4 rotation position detector
5 high-voltage battery
7 current detection unit
8 rotation position sensor
11 current command generation unit
12 speed calculation unit
13 three-phase/dq conversion unit
14 current control unit
15 dq/three-phase voltage conversion unit
16 carrier frequency calculation unit
17 carrier wave generation unit
18 PWM control unit
31 inverter circuit
32 PWM signal drive circuit
33 smoothing capacitor
161 pulse control determination unit
162 voltage phase calculation unit
163, 163A carrier reference phase setting unit
164 voltage phase error calculation unit
165 synchronous carrier frequency calculation unit
166 carrier frequency selection unit
167 recording unit

The invention claimed is:

1. An inverter control device that controls an inverter to rotationally drive a motor by generating a PWM pulse signal for driving a plurality of switching elements included in the inverter by pulse width modulation and outputting the PWM pulse signal to the inverter, wherein
the inverter control device performs the pulse width modulation by selecting one of a synchronous pulse control mode in which a frequency of a carrier wave used in the pulse width modulation is changed in accordance with a rotation speed of the motor and an asynchronous pulse control mode in which the frequency of the carrier wave is constant regardless of the rotation speed of the motor, and
at a time of switching from the asynchronous pulse control mode to the synchronous pulse control mode, the inverter control device changes a carrier reference phase that is a reference value of a phase of the carrier wave to a different value before and after the switching.

2. The inverter control device according to claim 1, wherein, at the time of switching, the carrier reference phase is changed a plurality of times.

3. The inverter control device according to claim 2, wherein a change amount of the carrier reference phase per time is 90° or less.

4. The inverter control device according to claim 1, comprising:
a pulse control determination unit configured to determine a number of synchronous pulses indicating a number of pulses of the carrier wave per cycle of a voltage command in the synchronous pulse control mode based on the rotation speed of the motor;
a carrier reference phase setting unit configured to set the carrier reference phase;
a voltage phase error calculation unit configured to calculate a voltage phase error indicating a relative phase difference between the voltage command and the carrier wave based on the number of synchronous pulses determined by the pulse control determination unit and a voltage phase indicating a phase of the voltage command with respect to the inverter;
a synchronous carrier frequency calculation unit configured to determine a frequency of the carrier wave in the synchronous pulse control mode based on the voltage phase error calculated by the voltage phase error calculation unit and the carrier reference phase set by the carrier reference phase setting unit;
a carrier frequency selection unit configured to select one of the frequency of the carrier wave determined by the synchronous carrier frequency calculation unit and a predetermined frequency of the carrier wave;
a carrier wave generation unit configured to generate the carrier wave at a frequency selected by the carrier frequency selection unit; and
a PWM control unit configured to generate the PWM pulse signal by performing the pulse width modulation using the carrier wave generated by the carrier wave generation unit and the voltage command.

5. The inverter control device according to claim 1, wherein the carrier wave is generated with a number of signals corresponding to a number of phases of the alternating-current current output to the motor by the inverter.

6. The inverter control device according to claim 1, further comprising a recording unit configured to record a change amount of at least one of a torque and a current of the motor when the value of the carrier reference phase is changed before and after the switching, wherein
when the change amount recorded in the recording unit exceeds a predetermined threshold value, the value of the changed carrier reference phase is replaced with another value.

7. An inverter control method of controlling an inverter to rotationally drive a motor by generating a PWM pulse signal for driving a plurality of switching elements included in the inverter by pulse width modulation and outputting the PWM pulse signal to the inverter, the method comprising:
performing the pulse width modulation by selecting one of a synchronous pulse control mode in which a frequency of a carrier wave used in the pulse width modulation is changed in accordance with a rotation speed of the motor and an asynchronous pulse control mode in which the frequency of the carrier wave is constant regardless of the rotation speed of the motor; and
changing, at a time of switching from the asynchronous pulse control mode to the synchronous pulse control mode, a carrier reference phase that is a reference value of a phase of the carrier wave to a different value before and after the switching.

\* \* \* \* \*